US 8,223,958 B2
Jul. 17, 2012

(12) United States Patent
Zoss et al.

(10) Patent No.: US 8,223,958 B2
(45) Date of Patent: Jul. 17, 2012

(54) DETERMINING AN ACTIVE LINE

(75) Inventors: Daud Abd Al-Malik Zoss, San Diego, CA (US); Henry K. Flournoy, San Diego, CA (US); George Bothwell, San Diego, CA (US); Robert Haselby, San Diego, CA (US); Kevin A. Merrill, San Diego, CA (US); Narendra Penumudl, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1421 days.

(21) Appl. No.: 11/260,431

(22) Filed: Oct. 27, 2005

(65) Prior Publication Data

US 2007/0116252 A1    May 24, 2007

(51) Int. Cl.
*H04M 1/00* (2006.01)

(52) U.S. Cl. .............. 379/377; 379/22.07; 379/27.01; 379/399.01; 375/222

(58) Field of Classification Search ......... 379/399.01–413.04, 1–35, 377–386
See application file for complete search history.

(56) References Cited

U.S. PATENT DOCUMENTS

| | | | |
|---|---|---|---|
| 4,440,984 A | 4/1984 | Buzbee | |
| 4,513,176 A * | 4/1985 | Fostveit | 379/9 |
| 4,748,652 A | 5/1988 | Nagai et al. | |
| 4,852,145 A | 7/1989 | Bevers et al. | |
| 4,870,678 A * | 9/1989 | Adachi | 379/100.06 |
| 4,987,586 A | 1/1991 | Gross et al. | |
| 5,056,133 A | 10/1991 | Iida | |
| 5,140,631 A | 8/1992 | Stahl | |
| 5,144,650 A | 9/1992 | Kiguchi | |
| 5,274,692 A | 12/1993 | Lechner et al. | |
| 5,506,891 A | 4/1996 | Brown | |
| 5,515,423 A | 5/1996 | Beck et al. | |
| 5,535,265 A | 7/1996 | Suwandhaputra | |
| 5,841,840 A | 11/1998 | Smith et al. | |
| 6,038,291 A * | 3/2000 | Cannon et al. | 379/74 |
| 6,081,587 A | 6/2000 | Reyes et al. | |
| 6,169,785 B1 | 1/2001 | Okazaki | |
| 6,292,546 B1 | 9/2001 | Gayrard | |
| 6,301,341 B1 | 10/2001 | Gizara et al. | |
| 6,359,972 B1 | 3/2002 | Schott et al. | |
| 6,408,071 B1 | 6/2002 | Kitayama | |
| 6,744,853 B1 | 6/2004 | Van Rooyen | |
| 6,788,953 B1 * | 9/2004 | Cheah et al. | 455/550.1 |
| 6,874,041 B1 * | 3/2005 | Burd et al. | 710/38 |
| 2002/0085695 A1 * | 7/2002 | Gerthe | 379/167.01 |
| 2004/0165718 A1 * | 8/2004 | Ramey et al. | 379/377 |

* cited by examiner

*Primary Examiner* — Yuwen Pan
*Assistant Examiner* — Ibraham Sharifzada

(57) ABSTRACT

Embodiments for connecting and disconnecting a first pair of conductors of a jack from a second pair of conductors of the jack, the first pair of conductors configured to connect to a first line and the second pair of conductors configured to connect to a secondary line, detecting a voltage or a current on the secondary line while the second pair of conductors is disconnected from the first pair of conductors, and notifying a user in response to detecting the voltage or the current on the secondary line while the second pair of conductors is disconnected from the first pair of conductors are disclosed.

27 Claims, 5 Drawing Sheets

DETERMINING AN ACTIVE LINE

BACKGROUND

RJ-11 jacks are used in countries around the world to connect telephones and other devices to telephone lines. Different countries, however, have different standards for devices that connect to telephone lines using an RJ-11 jack. This can make it difficult to configure the devices using the RJ-11 jack so that it is compatible with the different standards.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, a detection circuit is provided that enables a device, such as a modem, to connect to telephone or other communication lines while meeting the technical standards of various countries. The detection circuit causes a user to be notified if the device is improperly connected to a telephone or other communications line to allow the user to properly connect the device. In one particular embodiment, the detection circuit may provide a single hardware solution for use worldwide that solves a difficulty with properly connecting devices to two-wire and four-wire telephone lines.

Figure 1:
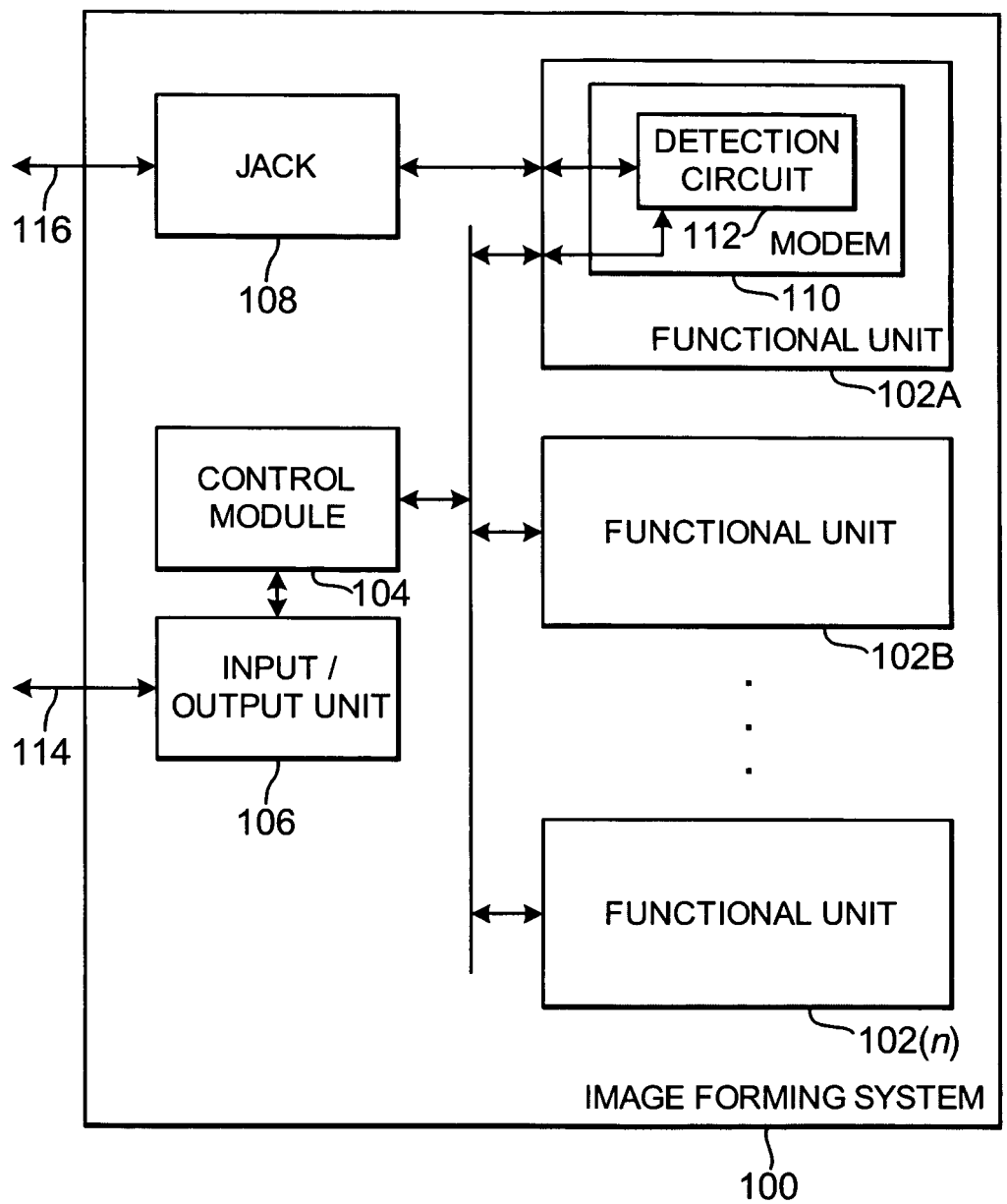
FIG. 1 is a block diagram illustrating an embodiment of an image forming system with a detection circuit according to one embodiment of the present disclosure.

FIG. 1 is a block diagram illustrating an embodiment of an image forming system 100 with a detection circuit 112. Image forming system 100 includes functional units 102A through 102(n) where n is greater than or equal to one and represents the nth functional unit, a control module 104, an input/output unit 106, and a jack 108. Functional unit 102A includes a modem 110 with a detection circuit 112.

Functional units 102 each include one or more image forming devices such as a printer, a scanner, a facsimile device, and/or a copier integrated into a common housing (not shown). The image forming devices may be configured to print, scan, fax, copy, and/or otherwise transfer images from one medium to another. Each image forming device may comprise a color or monochrome device.

Control module 104 includes any suitable combination of hardware and software components configured to control the operation of functional units 102, input/output unit 106, and detection circuit 112. In one embodiment, control module 104 comprises firmware (not shown) executable by a processor (not shown) to perform the functions of control module 104 described herein. The firmware may be stored in any suitable media accessible to the processor and may be stored on a media external to image forming system 100 prior to being stored in image forming system 100.

Input/output unit 106 includes any suitable combination of hardware and software components configured to allow a user to provide inputs to and receive outputs from image forming system 100 as indicated by an arrow 114. For example, input/output unit 106 may include a display (not shown) and a plurality of buttons (not shown). Input/output unit 106 may also include a port (not shown) or a network connection (not shown) configured to provide information to or receive information from another device (not shown) with an input/output device (e.g., a computer system).

Jack 108 is configured to connect to a set of electrical conductors 116. In one embodiment, jack 108 includes an RJ-11 jack and electrical conductors 116 include a two or four wire telephone cord. In other embodiments, jack 108 includes another type of jack and electrical conductors 116 include another type of communications cord.

Modem 110 is configured to provide information to and receive information from a device connected to jack 108 using electrical conductors 116. In one embodiment, functional unit 102A includes a facsimile capabilities and modem 110 includes a POTS (plain old telephone system) modem configured to send and receive facsimile transmissions.

Detection circuit 112 is configured to detect the presence of an active secondary line of electrical conductors 116. In one embodiment, modem 110 is configured to operate such that a first line of electrical conductors 116 is active without an active secondary line of electrical conductors 116. If a secondary line of electrical conductors 116 is active, modem 110 may not operate properly. Detection circuit 112 operates in response to signals from control module 104 to determine whether an active secondary line of electrical conductors 116 is present. In one embodiment, detection circuit 112 determines that a secondary line of electrical conductors 116 is active in response to detecting a voltage or current on the secondary line. In this embodiment, detection circuit 112 determines that a secondary line of electrical conductors 116 is not active in response to not detecting a voltage or current on the secondary line.

Figure 2:
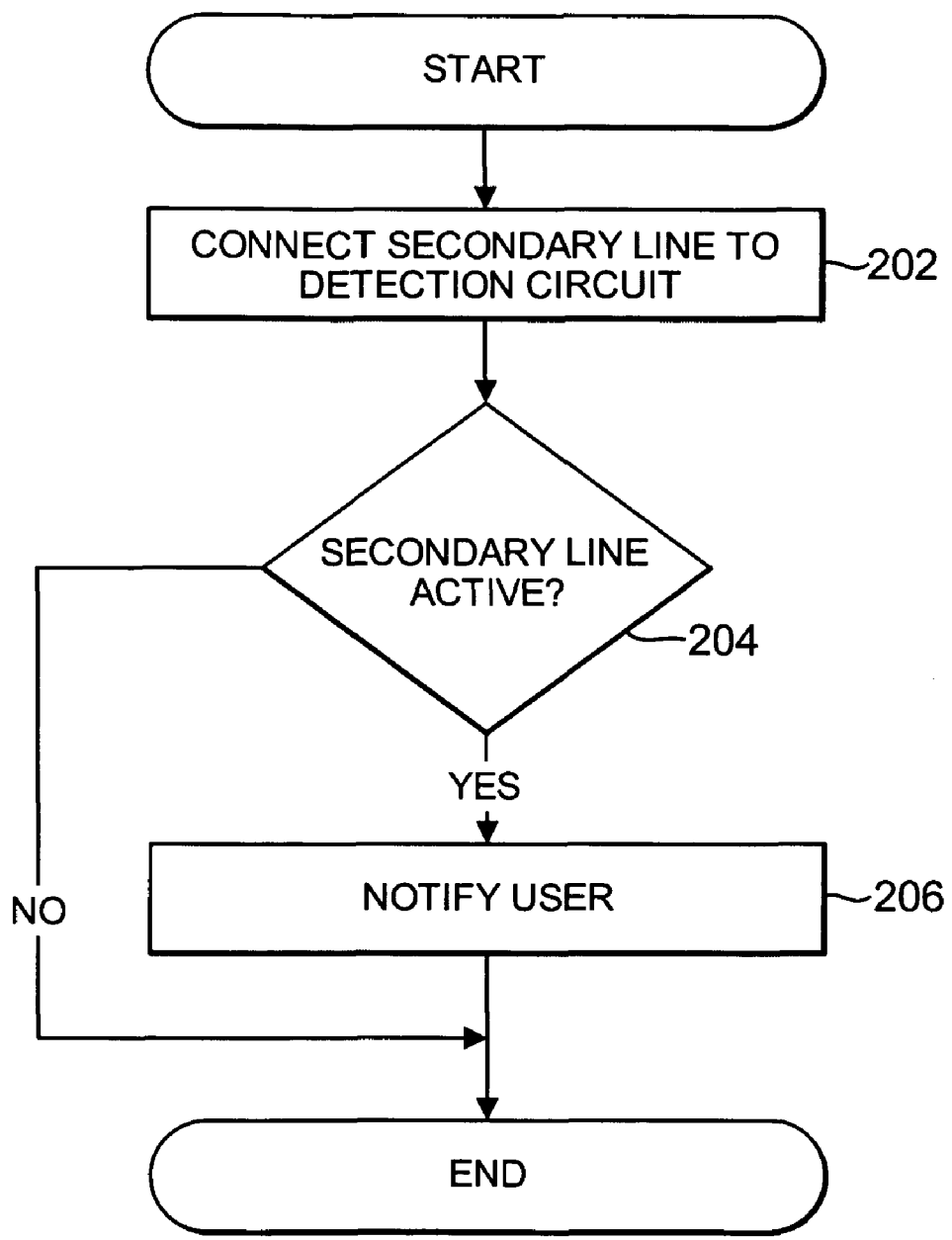
FIG. 2 is a flow chart illustrating an embodiment of a method for using a detection circuit according to one embodiment of the present disclosure.

FIG. 2 is a flow chart illustrating an embodiment of a method for using detection circuit 112. In the embodiment of FIG. 2, control module 104 causes a secondary line of electrical conductors 116 to be connected to detection circuit 112 as indicated in a block 202. In response to being connected to the secondary line of electrical conductors 116, detection circuit 112 determines whether the secondary line of electrical conductors 116 is active, generates a signal that indicates whether the secondary line of electrical conductors 116 is active, and provides the signal to control module 104 in one embodiment.

A determination is made by control module 104 as to whether the secondary line is active as indicated in a block 204. In one embodiment, control module 104 receives the signal from detection circuit 112 that indicates whether the secondary line of electrical conductors 116 is active and determines whether the secondary line is active using the signal.

If the secondary line is active, then control module 104 causes a user to be notified using input/output unit 106 as indicated in a block 206. The notification from control module 104 to the user may indicate that the user needs to connect a proper set of electrical conductors 116 to jack 108. For example, the notification may instruct the user to replace a four wire telephone cord connected to jack 108 with a two wire telephone cord or insert a telephone line 2/4 wire coupler between a four wire telephone cord and jack 108. The notification may also provide other suggested configurations to the user so that the user may prevent an active secondary line from being connected to jack 108. If the secondary line is not active, then the method ends.

In other embodiments, detection circuit 112 may be located separately from modem 110. For example, detection circuit 112 may be included with control module 104. In other embodiments, other functional units 102 may include a modem 110 and/or a detection circuit 112.

Figure 3:
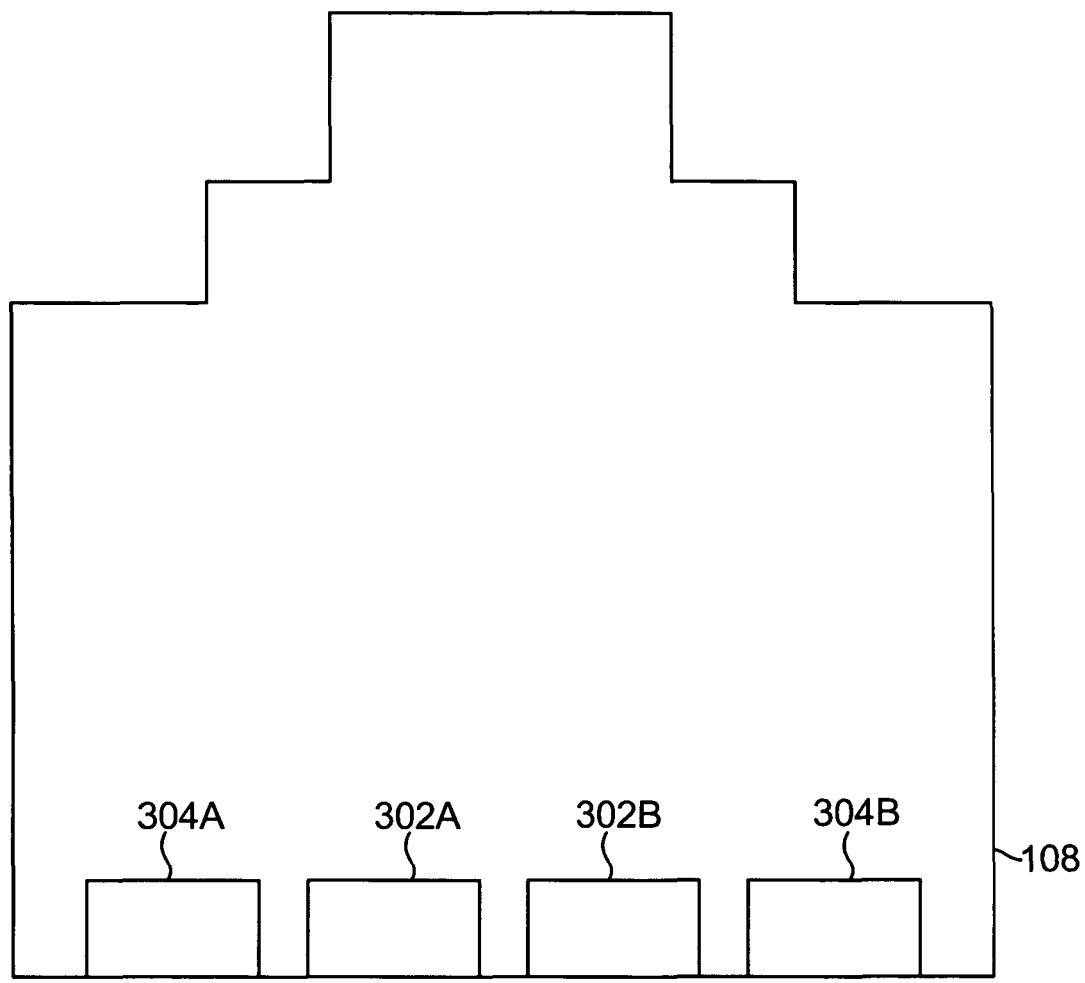
FIG. 3 is a diagram illustrating a cross section view of an embodiment of a jack according to one embodiment of the present disclosure.

FIG. 3 is a diagram illustrating a cross section view of an embodiment of jack 108. In the embodiment shown in FIG. 3, jack 108 includes an RJ-11 connector with an inner pair of conductors 302A and 302B and an outer pair of conductors 304A and 304B. The inner pair of conductors 302A and 302B connect to a first line formed by electrical conductors 116 and the outer pair of conductors 304A and 304B connect to a secondary line formed by electrical conductors 116.

In one embodiment, conductors 302A and 302B are configured to connect to TIP and RING signals, respectively, of a first telephone line formed by electrical conductors 116. In addition, conductors 304A and 304B are configured to connect to TIP and RING signals, respectively, of a secondary telephone line formed by electrical conductors 116.

Figure 4:
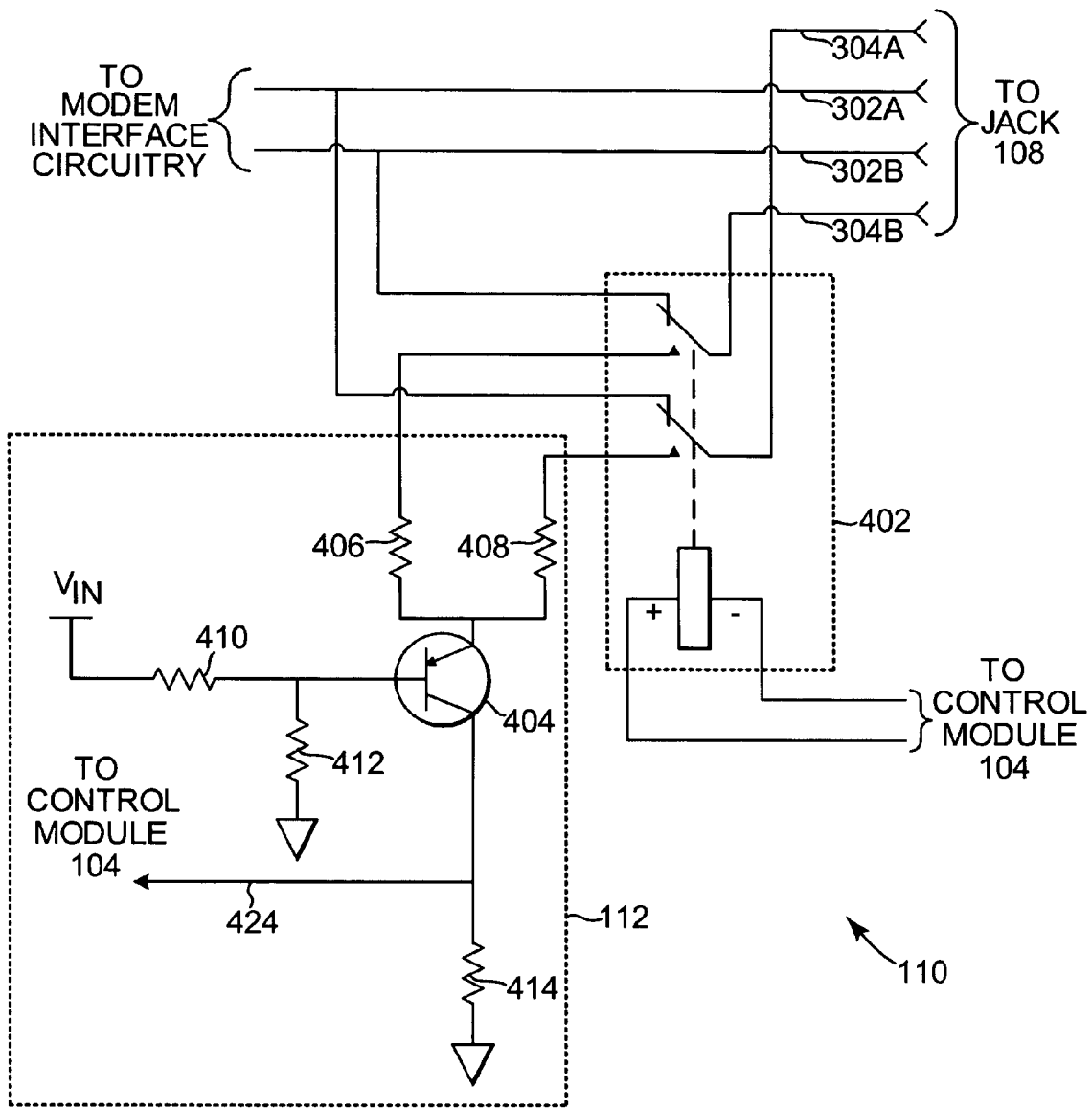
FIG. 4 is a schematic diagram illustrating an embodiment of a detection circuit according to one embodiment of the present disclosure.

FIG. 4 is a schematic diagram illustrating an embodiment of detection circuit 112. In the embodiment of FIG. 4, detection circuit 112 includes a relay 402, a PNP transistor 404, a resistive element 406 with one end connected to the emitter of transistor 404 and one end connected to relay 402, a resistive element 408 with one end connected to the emitter of transistor 404 and the other end connected to relay 402, a resistive element 410 with one end connected to a voltage source, $V_{IN}$, and the other end connected to the base of transistor 404, a resistive element 412 with one end connected to the base of transistor 404 and the other end connected to ground, and a resistive element 414 with one end connected to the collector of transistor 404 and the other end connected to ground. Resistive elements 410 and 412 form a voltage divider between voltage source, $V_{IN}$, and the base of transistor 404 to create a voltage at the base of transistor 404.

Detection circuit 112 couples to conductors 302A, 302B, 304A, and 304B of jack 108. Conductors 302A and 302B also connect to interface circuitry of modem 110 (not shown). In one embodiment, detection circuit 112 is configured such that the inner pair of conductors 302A and 302B is coupled to a first set of poles of relay 402, the outer pair of conductors 304A and 304B is coupled to a second set of poles of relay 402, and resistive elements 406 and 408 are coupled to a third set of poles of relay 402.

In a first state of operation of relay 402, relay 402 couples the second set of poles with the first set of poles such that the inner pair of conductors 302A and 302B couples to the outer pair of conductors 304A and 304B. Resistive elements 406 and 408 are not connected to the inner pair of conductors 302A and 302B and the outer pair of conductors 304A and 304B in the first state of operation of relay 402. As a result, the first line of electrical conductors 116 couples to the secondary line of electrical conductors 116, if present, in the first state of operation.

In a second state of operation of relay 402, relay 402 couples the second set of poles with the third set of poles such that the outer pair of conductors 304A and 304B couples to resistive elements 408 and 406, respectively. More particularly, relay 402 couples conductor 304B to resistive element 406 and conductor 304A to resistive element 408. The inner pair of conductors 302A and 302B is not connected to the outer pair of conductors 304A and 304B and resistive elements 406 and 408 in the second state of operation of relay 402. As a result, the secondary line of electrical conductors 116, if present, couples to the detection circuit 112 in the second state of operation.

Control module 104 operates relay 402 to cause relay 402 to switch between the first and second states of operation of relay 402. In one embodiment, relay 402 remains in the first state of operation until control module 104 causes relay 402 to switch to the second state of operation. By causing relay 402 to switch to the second state of operation, control module 104 causes detection circuit 112 to generate a secondary line signal 424 at the collector of transistor 404 to determine whether the secondary line is active. In one embodiment, secondary line signal 424 is connected to a silicon DAA (direct access arrangement) general purpose input pin (not shown) included in modem 110.

Figure 5:
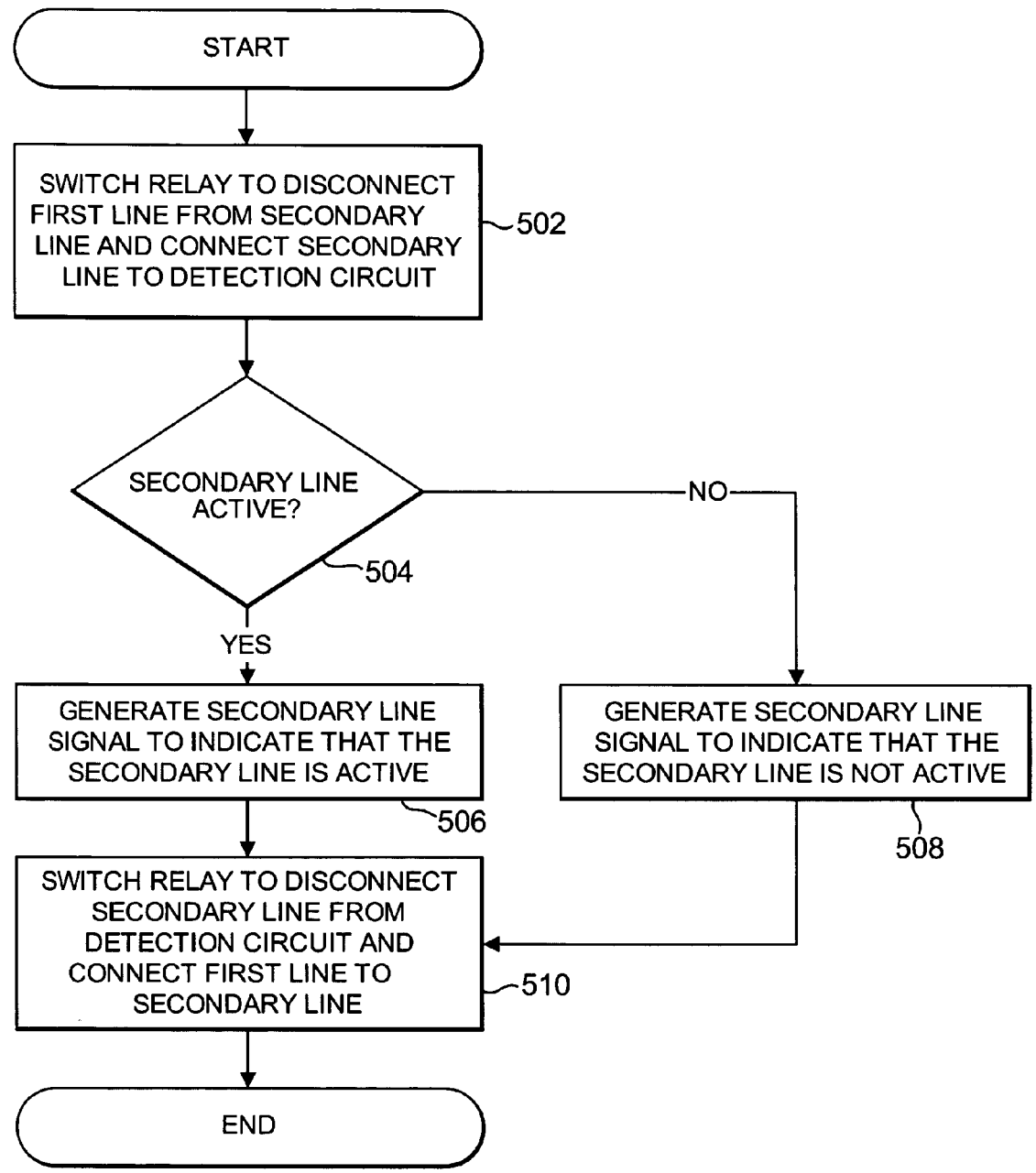
FIG. 5 is a flow chart illustrating an embodiment of a method for operating a detection circuit according to one embodiment of the present disclosure.

FIG. 5 is a flow chart illustrating an embodiment of a method for operating detection circuit 112. In the embodiment of FIG. 4, control module 104 causes relay 402 to be switched to disconnect the first line of electrical conductors 116 from the secondary line of electrical conductors 116 and connect the secondary line to detection circuit 112 as indicated in a block 502. More particularly, control module 104 causes relay 402 to switch from the first state of operation to the second state of operation. Accordingly, relay 402 couples the outer pair of conductors 304A and 304B to resistive elements 408 and 406, respectively.

A determination is made by detection circuit 112 as to whether the secondary line of electrical conductors 116 is active as indicated in a block 504. If the secondary line is not active, no voltage will appear across resistive elements 406 and 408 at the emitter of transistor 404 and no current will flow from transistor 404 to resistive element 414. Accordingly, resistive element 414 pulls the collector of transistor 404 to ground such that a low voltage, e.g., approximately zero volts, appears at the collector of transistor 404.

If the secondary line is active, then detection circuit 112 generates secondary line signal 424 to indicate that the secondary line is active as indicated in a block 506. If the secondary line is active, a voltage will appear across resistive elements 406 and 408 at the emitter of transistor 404 and current will flow from transistor 404 to resistive element 414 to generate a high voltage level at the collector of transistor 404. Detection circuit 112 provides the high voltage level from the collector of transistor 404 to control module 104 as secondary line signal 424 to indicate that the secondary line of electrical conductors 116 is active.

If the secondary line is not active, then detection circuit 112 generates secondary line signal 424 to indicate that the secondary line is not active as indicated in a block 508. If the secondary line is not active, no voltage will appear across resistive elements 406 and 408 at the emitter of transistor 404 and no current will flow from transistor 404 to resistive element 414. Accordingly, resistive element 414 pulls the collector of transistor 404 to ground such that a low voltage level appears at the collector of transistor 404. Detection circuit 112 provides the low voltage level from the collector of transistor 404 to control module 104 as secondary line signal 424 to indicate that the secondary line of electrical conductors 116 is not active.

Control module 104 causes relay 402 to be switched to disconnect the secondary line of electrical conductors 116 from detection circuit 112 and connect first line of electrical conductors 116 to the secondary line of electrical conductors 116 as indicated in a block 510. More particularly, control module 104 causes relay 402 to switch from the second state of operation to the first state of operation. Accordingly, relay 402 couples the outer pair of conductors 304A and 304B to the inner pair of conductors 302A and 302B.

In one embodiment, resistive element 406 includes a 5.1 Mohm resistor, resistive element 408 includes a 5.1 Mohm resistor, resistive element 410 includes a 220 Kohm resistor, resistive element 412 includes a 820 Kohm resistor, resistive element 414 includes a 390 Kohm resistor, and voltage source, $V_{IN}$, provides 3.3 volt voltage supply to resistive element 410. In this embodiment, a relatively high voltage on secondary line signal 424 indicates that secondary telephone line 424 is active, and a relatively low voltage on secondary line signal 424 indicates that secondary telephone line 424 is not active.

In one embodiment, relay 402 is included to conform to the standards set forth by the country of Germany to connect devices such as modem 110 with a telephone or other communications line. By including relay 402 in devices such as modem 110 in the United States, users may encounter difficulties if the secondary line of electrical conductors 116 is active when relay 402 is in the first state of operation, i.e., the first line and the secondary line will be shorted in the first state of operation of relay 402. By detecting that the secondary line of electrical conductors 116 is active, detection circuit 112 allows a user to be notified if modem 110 is improperly connected to a telephone or other communications line. Accordingly, the user may be prompted to properly connect the modem 110 to the telephone or other communications line.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the optical, mechanical, electro-mechanical, electrical, and computer arts will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A system comprising:
    first means for connecting and disconnecting a first pair of conductors of a jack from a second pair of conductors of the jack, the first pair of conductors configured to connect to a first line and the second pair of conductors configured to connect to a secondary line;
    second means for detecting a voltage or a current on the secondary line while the second pair of conductors is disconnected from the first pair of conductors by the first means; and
    third means for notifying a user in response to the second means detecting the voltage or the current on the secondary line while the second pair of conductors is disconnected from the first pair of conductors by the first means,
    wherein the second means comprises:
        a transistor;
        a first resistive element coupled between the transistor and one conductor of the second pair of conductors while the second pair of conductors is disconnected from the first pair of conductors; and
        a second resistive element coupled between the transistor and the other conductor of the second pair of conductors while the second pair of conductors is disconnected from the first pair of conductors,
        wherein in response to the secondary line being active, a voltage appears across the first resistive element and the second resistive element and current flows through the transistor.

2. The system of claim 1 wherein the first means is for connecting the second pair of conductors to the first pair of conductors prior to the second means detecting the voltage or the current on the secondary line and subsequent to the second means detecting the voltage or the current on the secondary line.

3. The system of claim 1 wherein the first line comprises a first telephone line and the secondary line comprises a second telephone line.

4. The system of claim 1 wherein the first pair of conductors couples to a modem.

5. A method comprising:
    disconnecting a first pair of conductors of a jack from a second pair of conductors of the jack, the first pair of conductors configured to connect to a first line and the second pair of conductors configured to connect to a secondary line;
    determining whether the secondary line is active subsequent to disconnecting the first pair of conductors from the second pair of conductors and prior to reconnecting the first pair of conductors to the second pair of conductors; and
    generating a signal that indicates whether the secondary line is active subsequent to disconnecting the first pair of conductors from the second pair of conductors and prior to reconnecting the first pair of conductors to the second pair of conductors,
    wherein determining whether the secondary line is active comprises:
        connecting one conductor of the second pair of conductors to a transistor through a first resistive element; and
        connecting the other conductor of the second pair of conductors to the transistor through a second resistive element,
        wherein in response to the secondary line being active, a voltage appears across the first resistive element and the second resistive element and current flows through the transistor.

6. The method of claim 5 further comprising:
    reconnecting the second pair of conductors to the first pair of conductors subsequent to determining whether the secondary line is active.

7. The method of claim 5 further comprising:
    notifying a user in response to the signal indicating that the secondary line is active.

8. The method of claim 5 wherein the first line comprises a first telephone line and the secondary line comprises a second telephone line.

9. The method of claim 5 wherein the first pair of conductors couples to a modem.

10. The method of claim 5 further comprising:
determining that the secondary line is active in response to detecting a voltage or a current on the secondary line subsequent to disconnecting the first pair of conductors from the second pair of conductors and prior to reconnecting the first pair of conductors to the second pair of conductors; and
determining that the secondary line is not active in response to not detecting the voltage or the current on the secondary line subsequent to disconnecting the first pair of conductors from the second pair of conductors and prior to reconnecting the first pair of conductors to the second pair of conductors.

11. An image forming system comprising:
a jack including a first pair of conductors configured to connect to a first line and a second pair of conductors configured to connect to a secondary line;
a detection circuit configured to determine whether a secondary line is active while the second pair of conductors is disconnected from the first pair of conductors; and
a control module configured to cause the first pair of conductors to be disconnected from the second pair of conductors and configured to cause the secondary line to connect to the detection circuit prior to the detection circuit determining whether the secondary line is active,
wherein the detection circuit comprises:
a transistor;
a first resistive element coupled between the transistor and one conductor of the second pair of conductors while the second pair of conductors is disconnected from the first pair of conductors; and
a second resistive element coupled between the transistor and the other conductor of the second pair of conductors while the second pair of conductors is disconnected from the first pair of conductors,
wherein in response to the secondary line being active, a voltage appears across the first resistive element and the second resistive element and current flows through the transistor.

12. The image forming system of claim 11 wherein the detection circuit is configured to determine that the secondary line is active in response to detecting a voltage or a current on the secondary line, and wherein the detection circuit is configured to determine that the secondary line is not active in response to not detecting the voltage or the current on the secondary line.

13. The image forming system of claim 11 wherein the detection circuit is configured to provide a signal that indicates whether the secondary line is active to the control module.

14. The image forming system of claim 13 wherein the control module is configured to cause a user to be notified in response to receiving the signal from the detection circuit indicating that the secondary line is active.

15. The image forming system of claim 11 wherein the control module is configured to cause the second pair of conductors to be connected to the first pair of conductors subsequent to the detection circuit determining whether the secondary line is active.

16. The image forming system of claim 11 further comprising:
a functional unit configured to transmit and receive facsimile transmissions using the first line.

17. The image forming system of claim 16 wherein the functional unit includes a modem coupled to the first line.

18. The image forming system of claim 11 further comprising:
a relay configured to connect and disconnect the first pair of conductors from the second pair of conductors.

19. The image forming system of claim 18 wherein the control module is configured to cause the relay to connect and disconnect the first pair of conductors from the second pair of conductors.

20. An apparatus comprising:
a jack including a first pair of conductors configured to connect to a first line and a second pair of conductors configured to connect to a secondary line;
a detection circuit; and
a relay configured to connect the first pair of conductors to the second pair of conductors and disconnect the second pair of conductors from the detection circuit in a first state of operation and configured to connect the second pair of conductors to the detection circuit and disconnect the second pair of conductors from the first pair of conductors in a second state of operation;
wherein the detection circuit is configured to determine whether the secondary line is active in the second state of operation, and
wherein the detection circuit comprises:
a transistor;
a first resistive element coupled between the transistor and one conductor of the second pair of conductors in the second state of operation; and
a second resistive element coupled between the transistor and the other conductor of the second pair of conductors in the second state of operation,
wherein in response to the secondary line being active, a voltage appears across the first resistive element and the second resistive element and current flows through the transistor.

21. The apparatus of claim 20 wherein the detection circuit is configured to generate a signal that indicates whether the secondary line is active in the second state of operation.

22. The apparatus of claim 20 further comprising:
a control module configured to cause the relay to switch between the first state of operation and the second state of operation.

23. The apparatus of claim 20 wherein the detection circuit is configured to determine that the secondary line is active in response to detecting a voltage or a current on the secondary line, and wherein the detection circuit is configured to determine that the secondary line is not active in response to not detecting the voltage or a current on the secondary line.

24. A non-transitory computer readable medium having instructions for causing a computer to execute a method comprising:
causing a first pair of conductors of a jack to be disconnected from a second pair of conductors of the jack, the first pair of conductors configured to connect to a first line and the second pair of conductors configured to connect to secondary line;
determining whether the secondary line is active subsequent to the first pair of conductors being disconnected from the second pair of conductors and prior to the first pair of conductors being reconnected to the second pair of conductors; and
notifying a user in response to determining that the secondary line is active,
wherein determining whether the secondary line is active comprises:
connecting one conductor of the second pair of conductors to the transistor through a first resistive element; and connecting the other conductor of the second pair of conductors to the transistor through a second resistive element, wherein in response to the secondary line being active, a voltage appears across the first resistive element and the second resistive element and current flows through the transistor.

25. The non-transitory computer readable medium of claim 24 having instructions for causing the computer to execute the method comprising: causing the second pair of conductors to be reconnected to the first pair of conductors subsequent to determining whether the secondary line is active.

26. The non-transitory computer readable medium of claim 24 wherein the first line comprises a first telephone line and the secondary line comprises a second telephone line.

27. The non-transitory computer readable medium of claim 24 having instructions for causing the computer to execute the method comprising:
- determining that the secondary line is active in response to detecting a voltage or a current on the secondary line subsequent to the first pair of conductors being disconnected from the second pair of conductors and prior to the first pair of conductors being reconnected to the second pair of conductors; and
- determining that the secondary line is not active in response to not detecting the voltage or the current on the secondary line subsequent to disconnecting the first pair of conductors from the second pair of conductors and prior to reconnecting the first pair of conductors to the second pair of conductors.

* * * * *

UNITED STATES PATENT AND TRADEMARK OFFICE
CERTIFICATE OF CORRECTION

| | | |
|---|---|---|
| PATENT NO. | : 8,223,958 B2 | Page 1 of 1 |
| APPLICATION NO. | : 11/260431 | |
| DATED | : July 17, 2012 | |
| INVENTOR(S) | : Daud Abd Al-Malik Zoss et al. | |

It is certified that error appears in the above-identified patent and that said Letters Patent is hereby corrected as shown below:

On the title page item (75), line 6, shows one of the Inventors names misspelled.

Penumudl; Narendra SHOULD BE... Penumudi; Narendra

Signed and Sealed this
Eighteenth Day of September, 2012

David J. Kappos
*Director of the United States Patent and Trademark Office*